United States Patent [19]

Pöhler et al.

[11] 4,346,668
[45] Aug. 31, 1982

[54] APPARATUS FOR THE CONTACT-FREE CONTINUOUS MEASUREMENT AND MONITORING OF MAGNETIC TRACKS ON MOVING FILM STRIPS

[75] Inventors: Friedmar Pöhler, Bergisch-Gladbach; Hans Falk, Leverkusen; Josef Müller, Marialinden; Hans J. Klein, Wuppertal; Franz Hoffacker, Langenfeld, all of Fed. Rep. of Germany

[73] Assignee: Agfa-Gevaert Aktiengesellschaft, Leverkusen-Bayerwerk, Fed. Rep. of Germany

[21] Appl. No.: 120,062

[22] Filed: Feb. 11, 1980

Related U.S. Application Data

[62] Division of Ser. No. 21,964, Mar. 19, 1979, Pat. No. 4,276,324.

[30] Foreign Application Priority Data

Mar. 22, 1978 [DE] Fed. Rep. of Germany ....... 2812633

[51] Int. Cl.$^3$ ............................................. G01N 21/89
[52] U.S. Cl. .................................... 118/665; 118/673; 118/712; 356/51; 356/72; 356/73
[58] Field of Search .................... 356/51, 72, 73, 375, 356/386, 385; 250/560, 561; 118/665, 673, 712

[56] References Cited

U.S. PATENT DOCUMENTS

| | | | |
|---|---|---|---|
| 2,751,313 | 6/1956 | Speed et al. | 118/712 |
| 2,999,944 | 9/1961 | Laycak | 250/560 |
| 3,093,742 | 6/1963 | Murphy | 250/560 |
| 3,232,547 | 2/1966 | Thiede et al. | 250/560 |

Primary Examiner—Vincent P. McGraw
Attorney, Agent, or Firm—Connolly and Hutz

[57] ABSTRACT

The invention relates to an apparatus and a method of contact-free, almost continuous measurement and monitoring of the width, thickness and position of magnetic tracks on moving film strips within wide limits of the speed. The track width and track position of the magnetic tracks are measured optically and the magnetically acting track cross section is measured electromagnetically via the track volume. The measured values are together recorded, evaluated and displayed and/or used for recontrolling the casting arrangement for emitting warning signals or for stopping the coating machine.

21 Claims, 7 Drawing Figures

APPARATUS FOR THE CONTACT-FREE CONTINUOUS MEASUREMENT AND MONITORING OF MAGNETIC TRACKS ON MOVING FILM STRIPS

This application is a division of copending application Ser. No. 21,964, filed Mar. 19, 1979, by the same inventors, now U.S. Pat. No. 4,276,324.

This invention relates to an apparatus for the contact-free, almost continuous measurement and monitoring of the width, thickness and position of magnetic tracks on moving film strips, independent within wide limits of the speed.

Film strips are provided with sound tracks, in particular magnetic sound tracks, in order to produce photographic films set to music. These magnetic tracks are required among other things for recording and playing back speech, music, or control signals synchronised with the frame frequency. A film strip of this type, for photographic and acoustic recording and playback is generally provided with two magnetic tracks, the first track, which is usually wider, being used for recording the sound and the second track, which is often narrower, being used as thickness compensating track so that the film strip lies flat and does not slide off the roll when being wound. More recently, this compensating track has additionally also been used for recording a signal for control purposes or as a second soundtrack in stereo recordings.

These tracks used to be placed on cine film and 16 mm narrow films. 8 mm narrow films were later provided with sound tracks and nowadays Super 8 narrow films are provided with soundtracks.

Magnetic tracks of this type are produced by various methods. Magnetic tracks which are applied to film material by adhesion or hot sealing tend to "float off" their assigned path particularly in the wet process of film development. These methods are therefore preferably used for subsequently applying magnetic tracks to already developed films. The application and checking of the track, which can be carried out in daylight in this case, of magnetic track material which has been previously checked with respect to geometry and electromagnetic properties, is relatively simple.

With films which are to be synchronously set to music directly during the exposure process and which still have to pass through the wet process, a very large number of durable magnetic tracks can be produced by casting on the rear side of the film which is already sensitive to light and still unexposed. The track-applying process and the monitoring, which is more extensive in this case, of the geometric and electromagnetic properties of the magnetic tracks, therefore have to be carried out in a dark room. In addition, faults in the track of the film would make valueless the film product which should already have a high quality finish and be otherwise perfect.

Various geometric faults and/or faults in the magnetic properties of the soundtrack can be produced irrepairably during the application of the track for magnetic sound, for example of Super 8 film in a dark room, and a single one of the faults listed below can make film material which is otherwise perfect unsaleable. It is therefore necessary to monitor the geometry of the track and the magnetic properties of the track more than sporadically during the actual recording process.

Faults are possible in the following geometrical and mchanical properties of the track:
 A (1) the width
 (2) the thickness
 (3) the position relative to the edge
 (4) the cross-sectional profile
 (5) the surface quality
 (6) the adhesion and the abrasion
 (7) the calendering or directional magnetisation (indirect faults).

Faults are possible in the following electromagnetic properties:
 (1) the sensitivity
 (2) the frequency response
 (3) the maximum recordability
 (4) the noise potential interval
 (5) the modulation noise
 (6) the ratio of erasure
 (7) drop out and drop in Nearly all the faults mentioned under A also influence the electromagnetic properties of the magnetic track, in particular, faults in A1 and A2 produce faults in B1 and B3, and faults in A4 and A5 produce faults in B2, B5 and B7.

The faults mentioned under B can occur in themselves or as the result of untypical magnetic track material. Additional fault or faults in A or B can also occur as the result of the subsequent developing process which is not however considered here.

The ideal, but unprofitable solution would undoubtedly be also to monitor as far as possible all possible faults mentioned under A and B during the application of the track for magnetic sound with respect to simple detection of the cause of faults.

It is known to take samples of sections of film at random, for example at the beginning or end of a production batch, and to test them. A large amount of wastage could however occur during this discontinuous process since a substantial amount of time lapses between the removal of the sample and the measured result, at the high casting speeds. The film strip coated in this period would be unusable if a fault had occured. This known testing method is also inaccurate and unreliable.

This state of affairs makes it necessary for economic reasons to monitor continuously, for example, the geometry and position of the magnetic tracks determined for Super 8 film in accordance with DIN 15 881, page 2, during the actual track-applying process.

Monitoring of the soundtrack with measuring heads operating in contact could only take place in the completely dry condition of the tracks so as not to damage them.

Taking into consideration the high abrasion of the magnetic track associated with the pigment properties, recorders which measure in contact would wear out very rapidly at the high casting speeds which are common nowadays. Only those measuring methods which operate without contact should therefore be accepted.

Since the geometry of the magnetic tracks also influences their electromagnetic properties, the problem requires a solution which is specific to the application. This means that the measurement of the position and width of the magnetic tracks should be carried out on an optical measuring basis and the measurement of the thickness of the track above the magnetically acting volume of the track should take place on a magnetic measuring basis. Optimum monitoring would be achieved in this way with a minimum of outlay.

The technical object of the invention is to create an apparatus which allow the width, thickness and position of magnetic tracks on moving film strips to be measured, recorded and displayed continuously without contact and substantially independently of the speed in darkness so that, in the event of casting faults, either the casting machine is stopped or the casting device is automatically controlled and regulated in such a way that optimum track application is achieved with a minimum of waste.

The object has been achieved according to the invention in that, almost simultaneously in a combined apparatus, the track width and position of the magnetic tracks are measured optically and the magnetically acting track cross-section above the tracking volume is measured electromagnetically and the measured values are together recorded, evaluated and digitally displayed, recorded on a recorder in synchronisation with the running of the machine and, depending upon the type of deviations determined, are utilised to recontrol the casting apparatus, to emit warning signals or to stop the coating machine.

In a particular embodiment, a prism arrangement is placed in front of a diode camera and projects the magnetic tracks to be measured on the target of the diode camera directly adjacent to each other so that the optical resolution is substantially improved in proportion to the scale of magnification of the lens.

It is particularly advantageous for unexposed film if the magnetic tracks are illuminated with infra-red light, wherein the light source consists of a semiconductor diode which is mounted at the focal point of a parabolic reflector and the parabolic reflector focuses all the radiation as a parallel beam via the convex lens on to a light guide which distributes the concentrated infra-red light of the diode uniformly on to the tracks via a cross-sectionl converter.

It has been found that, in order to keep within narrow tolerances, it is advantageous to use a limit value transmitter which produces adjustable limit value signals corresponding to the normal limits synchronously with each scan of the diode camera and continuously compares the edges of the magnetic tracks with these limit value signals, and a determination is made by electronic evaluation devices whether any of the tracks are too wide or too narrow and if so which ones, whether one or more tracks are absent or whether the tracks are offset relative to the edges of the web of film.

Using the apparatus according to the invention, it is possible optically to detect, to record and to control the width and position of the magnetic tracks with far greater accuracy than that required in order to observe the standards. The thickness or the volume of the magnetic tracks can also be detected with sufficient accuracy and evaluated together with the optical values using the method described. The method functions without contact, continuously and independently of the speed of the film strip and also functions in darkness as required for unexposed photographic films.

The apparatus and the method surprisingly showed that the measured values from the optical and magnetic measurements can be used astoundingly well for the automatic control and regulation of the casting arrangement, the prepared data being fed via an evaluating device to a controller which influences the position of the tracks relative to the edge of the film by shifting the caster in a lateral direction, which influences the thickness of the tracks by changing the distance between caster and film strip and which influences the width of the tracks by pressure control in the caster.

Using this apparatus, it is thus possible to achieve a uniform and optimum magnetic track quality with respect to the track width and position and the track thickness, with a minimum of wastage of expensive colour film material.

A number of means are created for evaluating the result of the continuous measurement. Thus, an alarm signal can be emitted or the machine automatically turned off immediately in the absence of a track. Any faults occurring are displayed digitally and recorded on a recorder which runs synchronously with the film strip so that the faults can easily be found and eliminated in a subsequent operation, only the defective small sections of the film strip having to be cut out if necessary.

Advantages of the measurement of the volume of the magnetic track are produced from the alternating saturation magnetisation of the magnetic track material by means of a magnetising coil which is preferably excited via a Triac with half-waves of alternating polarity from a 50 Hz network and from a measuring coil which is arranged vertically as far as possible from the magnetizing coil and centrally symmetric to the magnetising coil for reasons of decoupling, the signal received from the measuring coil being integrated independently of the preceding sign and averaging taking place via several magnetizing cycles.

Since the magnetising coil is fed intermittently with sinusoidal half-waves, being connected to the half-wave source by means of a Triac near the point at which the voltage passes through zero, and be disconnected near to the point at which the current passes through zero, only very slight attenuation in the magnetic track magnetization is produced for the apparatus substantially during the decomposition of the magnetic energy stored in the magnetizing coil in conjunction with a comparatively very small electromagnetic interference field intensity.

Other advantages, features and possible uses are illustrated in the following description in conjunction with the attached drawings in which.

Figure 1A:
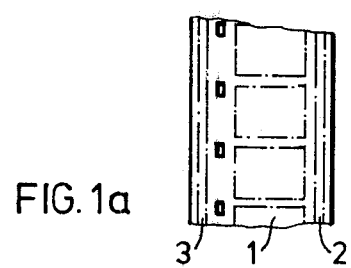
FIG. 1 shows a plan view of tracked film strips.
Figure 1B:
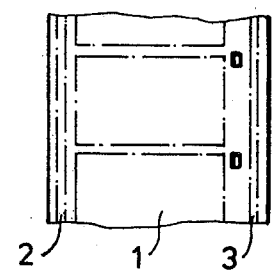

FIG. 1 shows various types of tracked film. FIG. 1a shows an 8 mm film strip 1 with a sound track 2 and a compensating track 3. FIG. 1b similarly shows a 16 mm film strip 1 with the sound track 2 and the compensating track 3.

Figure 1C:
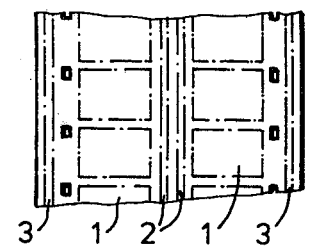

FIG. 1c shows the Super-8-film strip 1 which is used most at present in amateur photography, in double format. The two sound tracks 2 are located in the centre and the compensating track 3 on the two edges.

After the magnetic track-applying operation, this film strip is split between the two main tracks 2 into two single Super-8-films and is loaded into cassettes.

Figure 2:
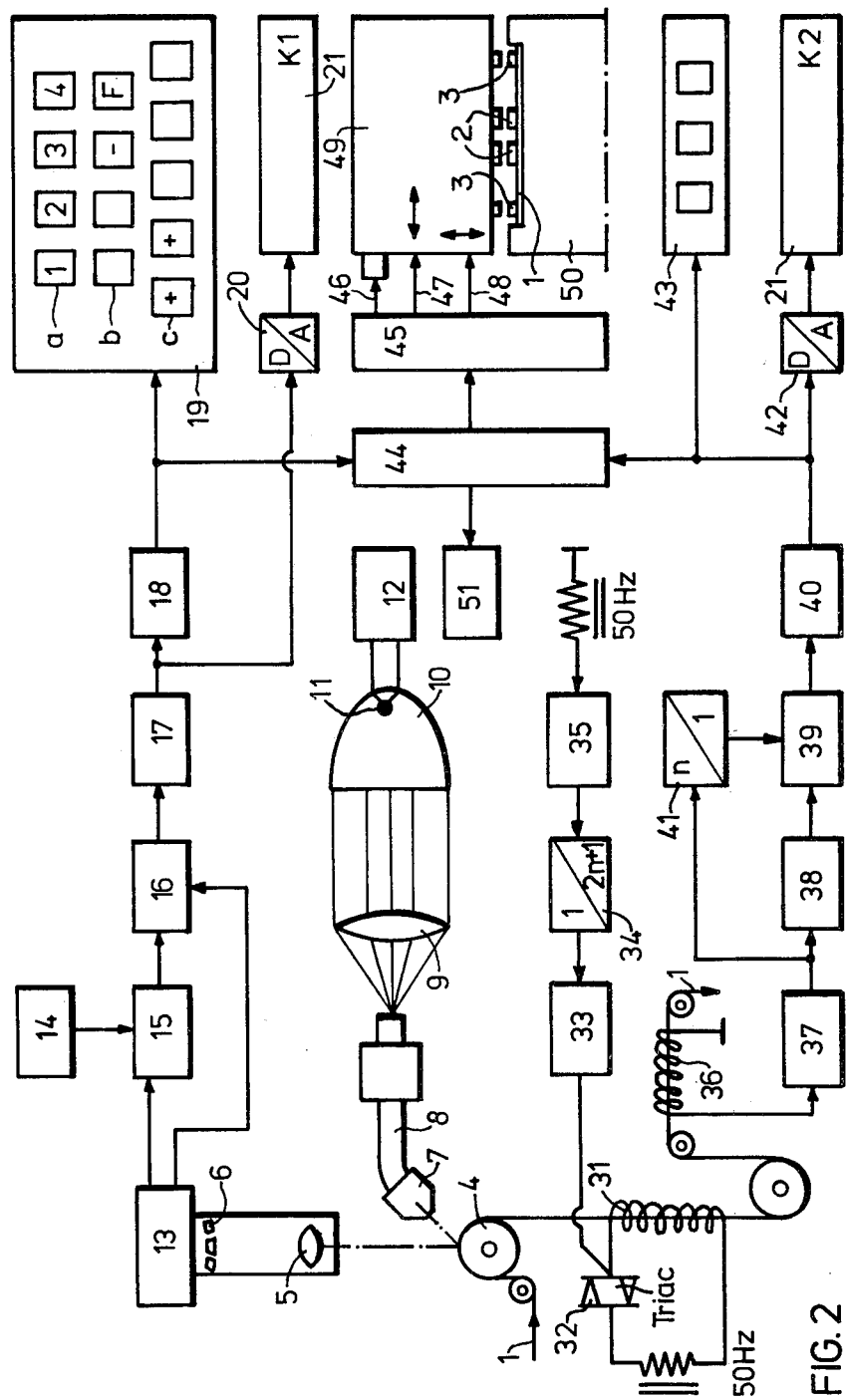
FIG. 2 shows an overall arrangement of the optical and electromagnetic measuring apparatus.

FIG. 2 shows the measuring principle of sound track geometry in the example of the double Super-8-film according to FIG. 1c.

Figure 3:
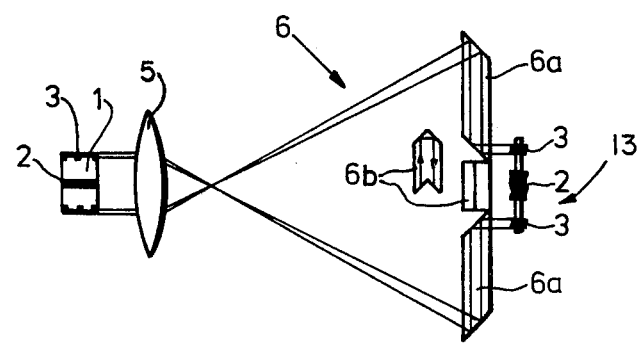
FIG. 3 shows a prism arrangement for optical track measurement.

The film 1 to be measured in precisely guided laterally, fed round a measuring roller 4 and sharply projected on to a conventional commercial target of a 1024 diode scanning camera 13 by means of a lens 5 and a special prism arrangement 6. If the double Super-8-film 1c were to be projected directly on the one inch target of a 1024 diode scanning camera 13, then a resolution of theoretically about 18μ (diode to diode) would be obtained, taking unavoidable variations in film width and film travel into consideration. This resolution is not however sufficient in view of the predetermined narrow tolerances. Since the image space lying between main track 2 and subsidiary track 3 is not of interest for the present measuring purposes, a special prism arrangement according to FIG. 3 can be inserted between lens 5 and diode camera 13 and the two external tracks 3 can be projected optically directly adjacent to the two main tracks 2 by means of the prisms 6. The image of the two main tracks 2 is fed through the prism 6b and external tracks 3 through prism 6a, FIG. 3, so that the paths of light of all projections are equally long and a sharp projection of all four tracks is thus possible at the same time. In addition, the prisms are created and arranged in such a way that the four sections of the tracks which are illuminated simultaneously exactly perpendicularly to the direction of travel of the film are projected locally also simultaneously on the target. After an approximate 5-fold magnification through an infra-red corrected lens, a sufficient resolution of theoretically 5μ (diode to diode), and thus a substantial technical improvement in the measuring method, is obtained.

The film is illuminated by a gallium arsenide diode 11 which radiates at about 940 nm at about 400 mW, which is fed by a section 12 of the mains which is of stable current and which is incorporated into a parabolic reflector 10. The parallel beam issuing from the reflector is focused by means of a concentrating lens 9 whose focal length is adapted to the aperture of the subsequent light guide 8 and is fed to a cross-sectional converter which illuminates the four tracks uniformly at an angle of about 50° to the vertical.

Figure 4:
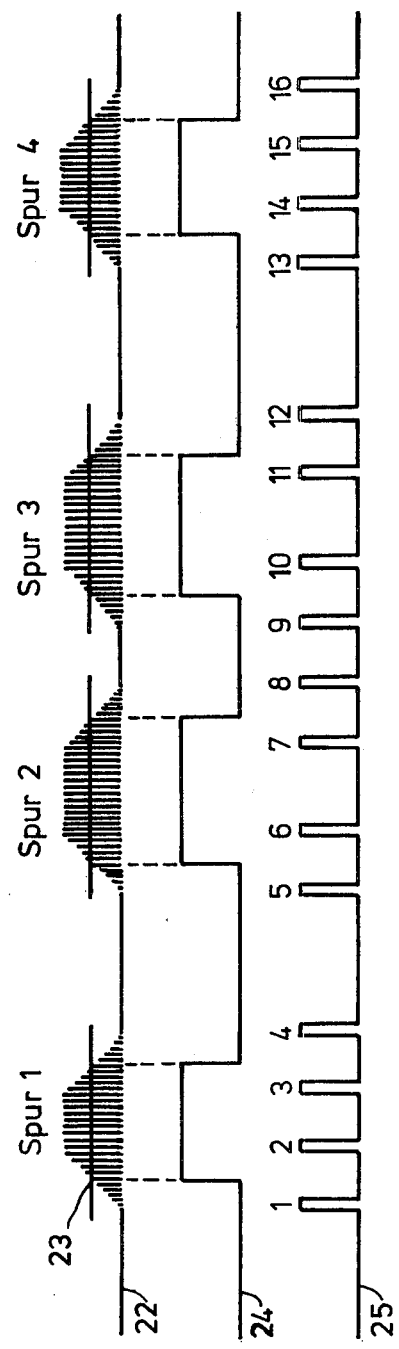
FIG. 4 shows a pulse schedule for optical measurement.

The diode scanning camera 13 (FIG. 2) produces from the four magnetic tracks a "video signal" 22 (FIG. 4) which is converted into a "track signal" 24 (FIG. 4) by using an adjustable trigger level 23 (FIG. 4). The task of the subsequent measuring electronic devices is to monitor the 8 track edges with respect to the observance of defined tolerances determined in the standard.

For this purpose, a lower and an upper limit value mark which can be set by switch 14 (FIG. 2) to correspond to the standard is produced according to FIG. 4 for each of the 8 track edges (thus a total of 16 limit value marks are used) by means of a limit value transmitter 15 (FIG. 2) signal 25. Each edge of the track signal is compared in a subsequent "comparator" 16 (FIG. 2) with respect to its position relative to the limit value signals.

If, for example, the first track edge signal 24, FIG. 4 appears in location after the second limit value mark or if the second track edge appears before the third limit value mark, then track 1 is evaluated as "too narrow". The same applies to the wider tracks. (In the example in FIG. 4, all 8 track edges lie within the set limits).

The indicator 19 is started by a suitable fault evaluation logic 17 via a fault store 18. The four display units 19b start either with the symbol "−" meaning "track too narrow" or with the symbol "F" meaning "track absent" and the five display units 19c start with the symbol "+" meaning "track too wide". The four display units 19a display the track numbers 1, 2, 3 and 4 and serve to allocate the "−", "F", and "+" symbols to the four tracks during the casting process in the dark room. By the arrangement of four "−" and five "+" displays, it is possible to indicate a displacement of the track position to one or other side of the film edge without additional expense in evaluating electronics and displays.

The recorder 21 which is connected via a digital-analogue converter 20 and whose paper feed is proportional to the film path, acts as a fault printout.

The arrangement allows resolution transversely to the direction of travel of the film of better than 10μ and a resolution in the direction of travel of the film of 30 ms which is particularly dependent upon the film speed, illumination intensity and remission properties of the magnetic tracks, upon the sensitivity of the diode target and upon the aperture ratio of the lens.

At a casting speed of about 80 m/min., this corresponds to a film path of 4 cm. These data can be further improved according to the method, for example by use of larger diode cameras with a larger number of diodes, but this is not necessary with the present requirements in quality.

Although the optical measuring arrangement allows the position and the width of the tracks and their faults to be measured, it is possible to measure almost simultaneously the track cross-section via the track volume by combination with the electromagnetic method and the associated apparatus. It is thus possible to continuously measure and control the amount of magnetically acting magnetic track material applied to the film strip.

According to the law of induction, $$B = \frac{\Phi}{q}, \text{ where } \Phi = \text{magnetic flux, and}$$
$$q = \text{cross-section of magnetic flux,}$$

and the voltage $U_o$ induced in a measuring coil having a number of turns w by the alternately magnetised and moved material is given by $$U_o = -w\frac{d\Phi}{dt} = -wq\frac{dB}{dt}$$

If the magnetic track material introduced into the magnetising coil is magnetised to saturation and if the pigment used for casting is assumed to have uniform and constant properties according to its type, then there is substantially independence of the constancy of the magnetizing field. In order to additionally eliminate the influence of the film speed and the time conditions of magnetization, the voltage $U_o$ induced in the measuring coil is integrated over a number of magnetizing cycles, independently of preceding sign. A value $U_1 = c \cdot q$ is thus obtained, which contains only q as single variable and is standardised and displayed.

The resolution obtained in accordance with this principle is better than 1% with the track dimensions given by the standard and a magnetic layer thickness of, for example, about 8μ, and is thus far better than the constancy required of the electromagnetic properties of magnetic tracks.

With the measuring method applied here, the sum of the magnetic track volume of all four tracks located in the measuring coil is determined i.e. not changes of track profile which change in volume, and possible changes in the cross-section of the tracks among themselves (which, however, remain constant in their sum) cannot be determined by this measuring method. In practice, such cases have not been observed.

According to FIGS. 2 and 5, the principle of measurement is as follows:

The continuous film strip to which is applied a track of magnetic pigment is guided through a magnetizing coil 31 of rectangular internal cross-section which is adapted to the film strip according to FIG. 1c, and is magnetized intermittently therein with half-waves of the sinusoidal 50 Hz-mains period with alternating polarity until saturation. The length of the coil is selected in such a way that a sufficiently homogeneous magnetic field is produced by it.

Trains 35 (FIG. 5) of pulses which coincide with instants at which the mains voltage passes through zero are derived from the 50 Hz-mains by means of a zero voltage pulse generator 35 (FIG. 2) of the repetition frequency of 100 Hz. These pulse trains are fed via a frequency divider 34 with an adjustable odd-numbered step-down ratio, a Triac start up circuit 33 and a Triac 32 in such a way that the Triac is conductive near the mains voltage zero passage $U_{31}$ (FIG. 5) and is blocked again near the current zero passage $J_{31}$ (FIG. 5). The step-down ratio of the frequency divider 34 is dependent upon the length of the magnetizing coil, the minimum speed of the film strip, and the heating of the magnetizing coil, and is selected with a view to having a small magnetizing frequency as compared to the mains frequency, whereby the film strip 1 is conveyed between the changes of polarity at least sufficiently far to prevent significant attenuation of the previous magnetization.

Figure 5:
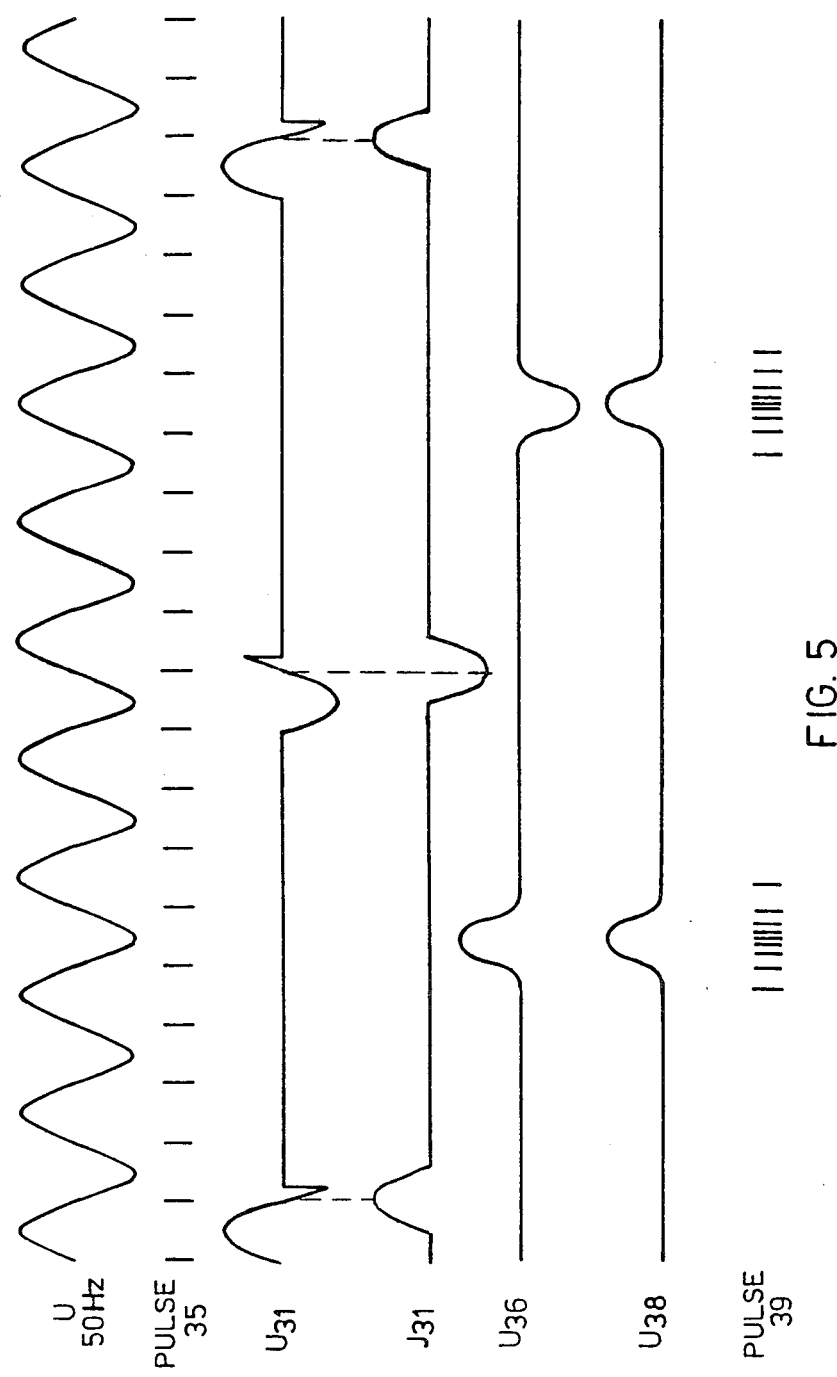
FIG. 5 shows a pulse schedule for magnetic measurement.

A voltage $U_{36}$ (FIG. 5) is induced in the measuring coil, which is substantially shorter than the magnetizing coil and has a rectangular internal cross-section adapted to the film strip, is amplified in an amplifier 37, is freed from possible interference contents in a low-pass filter, is rectified in 38 ($U_{38}$, FIG. 5) and is integrated over a number n of full periods by means of a digital integrator 39 consisting of a voltage frequency converter with a subsequent counter, pulse 39 (FIG. 5). The result of measurement is stored over the measuring period and is displayed decimally on the display unit 43 or is recorded after digital-analogue conversion 42 via channel 2 on the same analogue recorder as the optical track measurement for the fault print out.

It is essential for the method and the apparatus that the magnetizing coil 31 excited with a field intensity of 80,000 A/m induces no interference signals in the measuring coil 36 since this would falsify the measured result. A symmetric amplifier of high common mode rejection is therefore connected to and immediately adjacent to the measuring coil 36 and is placed together with the measuring coil 36 in a double magnetic screening and is arranged perpendicularly to and centrally symmetric about the magnetizing coil.

Signals are formed in the fault processor 44 from the values of the optical and electromagnetic measurements and continuously charge a controller 45 (FIG. 2). The controller 45 is designed in such a way that it can act on the two degrees of freedom of the caster 49.

In order to centre the caster 49 symmetrically about the edges of the film strip, the controller 45 acts on a drive mechanism 47 which shifts the caster 49 sideways.

In order to control the thickness of the track, the controller 45 acts via a drive mechanism 48 which sets the distance between caster 49 casting roller 50 and film strip 1 and the widths of the magnetic track are finally controlled by control of the pressure 46 with which the magnetic track material is brought into the caster 49. Since the caster casts all four tracks simultaneously, individual control of the tracks is not possible, but it is not necessary either. The control means is set in such a way that it continuously compensates for irregularities in the magnetic track material, in the film thickness and in the film width and allows a substantial improvement in quality owing to the unitorm track properties obtained.

Faults which cannot be compensated by the control means (for example blockage of a casting nozzle, interruptions in the track, clogging of the tracks) and those faults which exceed by several times the predetermined limits per time unit, lead to an automatic mechanical stoppage.

We claim:

1. An apparatus for substantially continuously measuring and monitoring the width, thickness and position of magnetic tracks on a moving film strip in a manner which is free of contact with the film strip and which is approximately independent of the speed of movement of the film strip, comprising optical means for measuring the magnetic track width and magnetic track position, electromagnetic means for measuring the volume of the magnetic track, the apparatus being further characterized in that the optical means comprises lighting means for the film strip and the magnetic tracks, an electronic camera, projecting means for projecting the illuminated magnetic tracks onto the electronic camera, the electronic camera being constructed and arranged to generate a scanning electrical signal corresponding to width and position of the illuminated magnetic tracks, limit value means generating limit value signals predetermining the edge positions for every magnetic track, comparison means for electrically continuously comparing the scanning electrical signal with the limit value signals whereby the width and position of the magnetic tracks are determined, readout means reading out a difference between the limit value signals and the scanning electrical signals to monitor whether the tracks are of the proper width and correctly positioned on the film strip, the electromagnetic measuring means being further characterized by magnetizing means for magnetizing a portion of the moving film strip by transmitting flux changing magnetic pulses through it, means for measuring a signal generated in response to the magnetic pulses in an adjacent portion of the magnetic tracks on the film strip, and track thickness readout means for reading out the measured signals to determine whether they comply with a predetermined standard which corresponds to the thickness of the tracks.

2. An apparatus as set forth in claim 1, wherein the lighting means comprises an infrared light source.

3. An apparatus as set forth in claim 2, wherein the infrared light source has means for uniformly distributing it on the magnetic tracks.

4. An apparatus as set forth in claim 1, wherein the electronic camera magnifies optically the illuminated images of the magnetic tracks.

5. An apparatus as set forth in claim 1, wherein the limit value means is constructed and arranged to be adjustable.

6. An apparatus as set forth in claim 1, wherein an automatic control device is provided, processing means are provided whereby the optical and magnetic measurements are processed and fed to the automatic control device, the magnetic tracks being applied to a moving film strip by a casting device, lateral and distance positioning-drive means and means for controlling the pressure on the casting device for controlling the edge positions, the thickness and the width of the magnetic tracks, whereby the width and position of the tracks is adjusted in response to the optical measurements, and thickness is adjusted in response to the magnetical measurement.

7. An apparatus as set forth in claim 1, wherein the electromagnetic measuring means is further characterized in that the electromagnetic coil is connected near the points where the main voltage passes through zero and is disconnected near the points at which the current passes through zero, and the electromagnetic measuring coil is disposed in a direction substantially perpendicular to the magnetization means whereby parasitic disturbance is minimized.

8. An apparatus as set forth in claim 1, characterized in that the track thickness readout means displays measured values of the magnetic track volume digitally and records them by means of an analogue recorder.

9. An apparatus as set forth in claim 1, wherein the predetermined standard relates to the toatl thickness of the applied magnetic tracks.

10. An apparatus as set forth in claim 1, wherein the lighting incorporates a prism arrangement for uniformly distributing it on the magnetic tracks.

11. An apparatus as set forth in claim 1, wherein the electronic camera is a diode camera.

12. An apparatus as set forth in claim 1, wherein the magnetizing means incorporates a Triac, a magnetizing coil connected to the Triac.

13. An apparatus as set forth in claim 12, wherein arrangements for Triac startup are provided in conjunction with a frequency divider having an odd-numbered stepdown ratio.

14. An apparatus as set forth in claim 13, wherein a zero voltage pulse generator is connected to the Triac.

15. An apparatus as set forth in claim 1, wherein the magnetization means includes a measuring coil, and guide means for leading the film strip through the measuring coil.

16. An apparatus as set forth in claim 15, wherein an amplifier is connected to the measuring coil, the amplifier having a symmetrical input, a two-path rectifier, a digital integrator, a measured value store and a frequency divider.

17. An apparatus as set forth in claim 16, wherein a digital display and an analogue recorder is connected for recording a measure of track volume.

18. An apparatus as set forth in claim 17, wherein in the analogue recorder has another channel for recording optically measured track faults and wherein alarm devices are provided.

19. An apparatus as set forth in claim 10, wherein the prism arrangement is arranged upstream of the diode camera and projects magnetic tracks to be measured directly adjacent to each other on the electronic camera, the electronic camera has a lens having a scale of magnification whereby the optical resolution is improved in proportion to the scale of magnification of the lens.

20. An apparatus as set forth in claim 1, wherein the lighting means are provided for illuminating the magnetic tracks with infrared light, the lighting means comprises a semiconductor diode which is mounted at the focal point of the parabolic mirror to lead the parallel beam via a convex lens onto a light guide which distributes the beam of infrared light of the diode via a cross-sectional converter uniformly on to the magnetic tracks on the film strip.

21. An apparatus as set forth in claim 1, wherein the limit value means is constructed and arranged to be adjusted as desired and to correspond to standard limits for the coating of sound tracks on film strips, a limit value transmitter and comparison means connected to the limit value means which feeds them limit values which continuously compare the limit value signals with the track edges of the magnetic tracks, and a determination is made by a suitable electronic evaluating device as to whether a track incorrect in width or is missing or whether the tracks are offset in relation to the edge of the film strip.

* * * * *